(No Model.)  3 Sheets—Sheet 2.

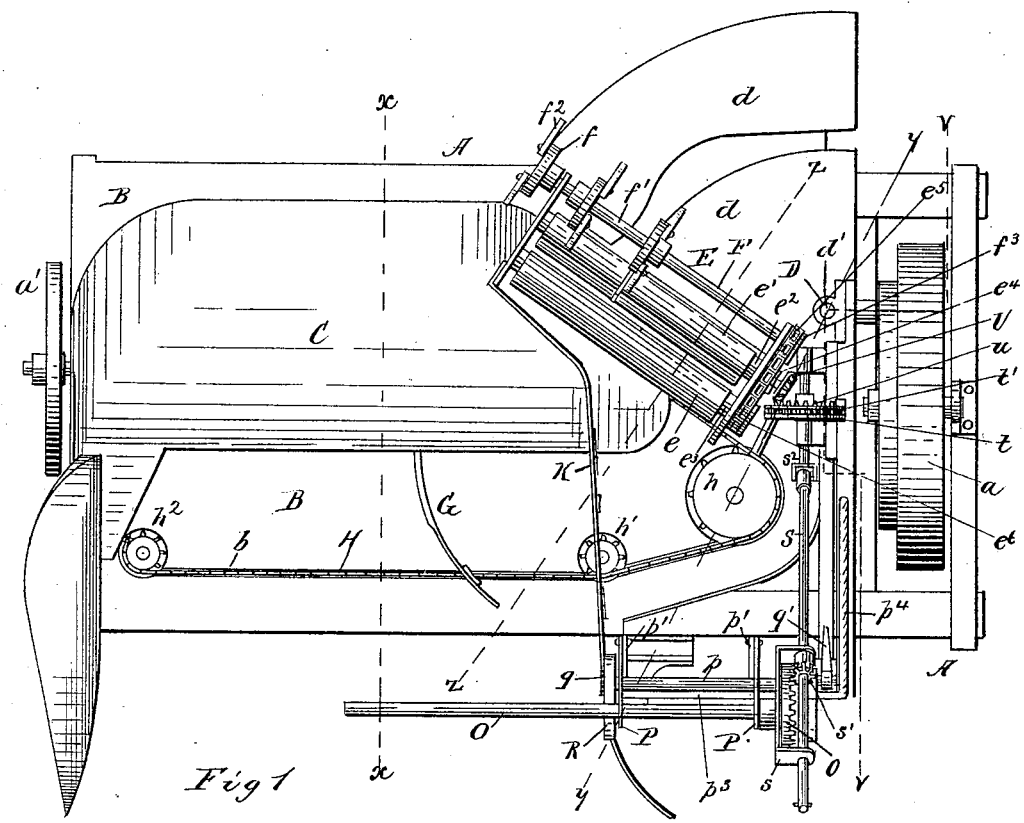
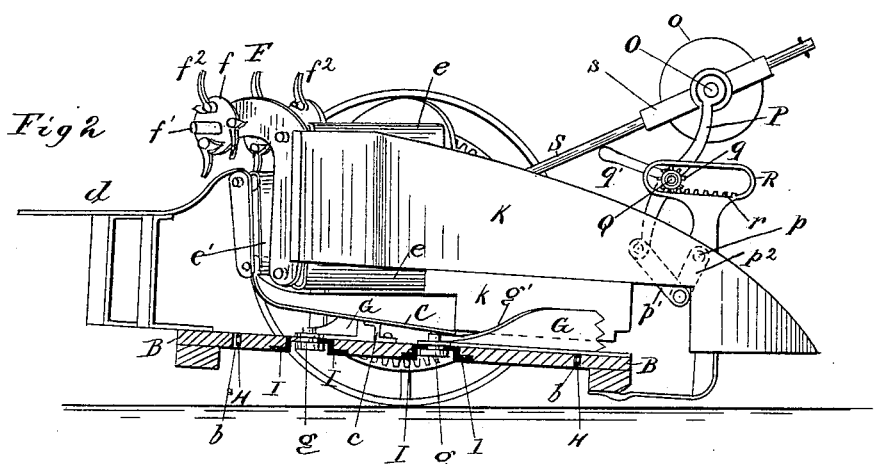

R. EMERSON.
HARVESTING MACHINE.

No. 349,932. Patented Sept. 28, 1886.

Witnesses
W. C. Colies
P. E. Renner

Inventor
Richard Emerson
By Coburn & Thacher
Attorneys (No Model.) 3 Sheets—Sheet 3.

R. EMERSON.
HARVESTING MACHINE.

No. 349,932. Patented Sept. 28, 1886.

Witnesses
H. C. Corlies
P. E. Remmems.

Inventor
Richard Emerson
By Coburn & Thacher
Attorneys

UNITED STATES PATENT OFFICE.

RICHARD EMERSON, OF SYCAMORE, ILLINOIS, ASSIGNOR OF ONE-HALF TO HORATIO H. MASON, OF SAME PLACE.

HARVESTING-MACHINE.

SPECIFICATION forming part of Letters Patent No. 349,932, dated September 28, 1886.

Application filed October 20, 1884. Serial No. 146,061. (No model.)

*To all whom it may concern:*

Be it known that I, RICHARD EMERSON, a citizen of the United States, residing at Sycamore, in the county of De Kalb and State of Illinois, have invented certain new and useful Improvements in Harvesting-Machines, which improvements are fully set forth in the following specification, reference being had to the accompanying drawings, in which—

Figure 3:
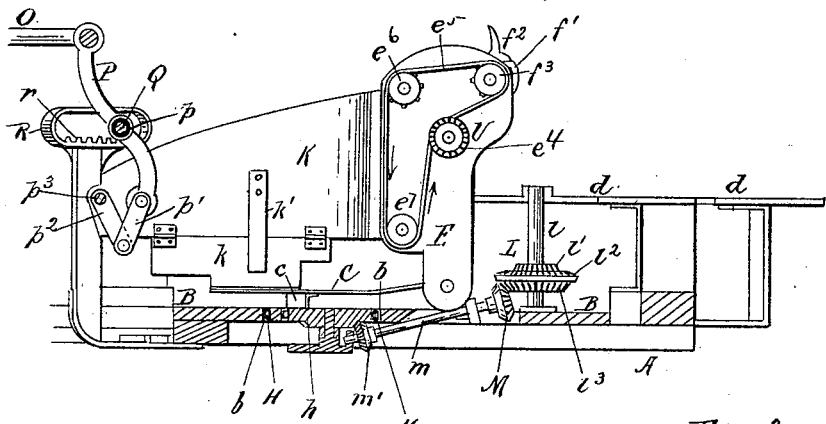
Figure 4:
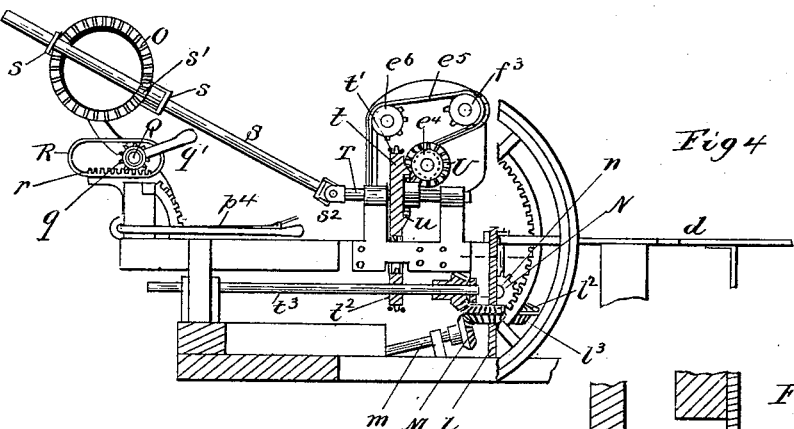
Figures 5, 6:
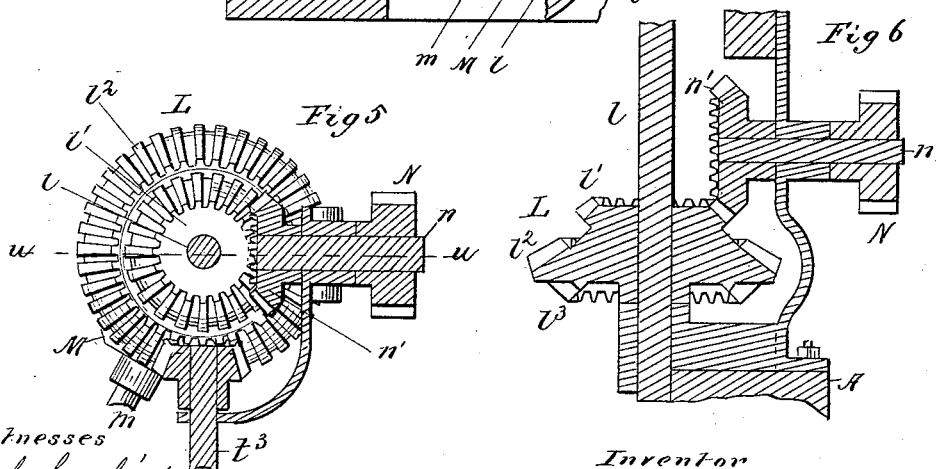
Figure 7:
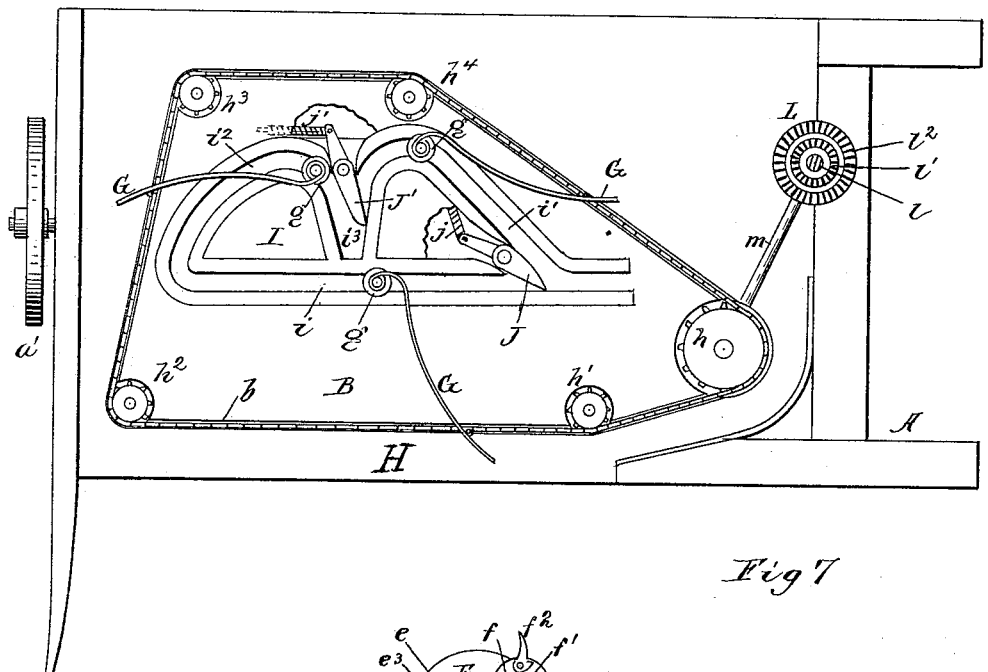

Figure 1 represents a plan view of a machine embodying my improvements; Fig. 2, a cross-section of the same, taken on the line $x$ $x$, Fig. 1; Fig. 3, a section of the same, taken on the line $y$ $y$, Fig. 1; Fig. 4, a detail section of the same, taken on the broken line $v$ $v$, Fig. 1; Fig. 5, a detail plan section taken on the line $w$ $w$, Fig. 4, and on an enlarged scale; Fig. 6, a detail section taken on the line $u$ $u$, Fig. 5, and on the same enlarged scale; Fig. 7, a plan view of the platform, the table being removed, on the same scale as Fig. 1; and Fig. 8, a section of the machine, taken on the line $z$ $z$, Fig. 1.

My invention relates to machines for harvesting grain, and particularly that class of machines in which an automatic binder is used.

The invention consists in certain improvements in the gathering and delivering apparatus, by means of which the cut grain is brought to the binder in suitable shape for the operation of the binding mechanism; and one of the main objects of my present invention is to obviate the necessity of elevating the grain over the main supporting-wheel of the machine.

I will proceed to describe in detail one way in which I have carried out my invention in practical form, and will then point out definitely in the claims the special improvements which I believe to be new and wish to protect by Letters Patent.

The machine to which my improvements are applied is in many of its general features substantially the same as similar machines now in use, and these well-known parts will not be minutely described.

In the drawings, A represents the main frame of the machine; $a$, the main supporting-wheel, and $a'$ the grain-wheel. The platform B is, as usual, back of the finger-bar, so that the grain will fall thereon as it is cut, and above this platform I provide a table, C, reaching from the rear of the platform forward, but not up to the finger-beam, leaving the platform uncovered for a distance back of the finger-beam considerably less in width than the length of ordinary grain. This table is located only a short distance above the platform, and is attached at its outer end to the framework of the machine, being curved upward and forward somewhat, so as to direct the grain toward the inner end of the platform. The table is free at its inner end, and, being of thin metal plate, will drop of its own weight until it finds support. Under the table, near the center thereof, I provide a support, $c$, rising from the platform a short distance, on the top of which the table rests when left free to drop. From this point to the inner end, however, there is no support whatever to the table, and it will bend downward of its own weight, presenting an incline inward and slightly forward. The table may perhaps be attached to the central support, if it is found that the movement of the free end from this point is sufficient, and in a machine with a short cut the support may perhaps be entirely dispensed with.

Figure 8:
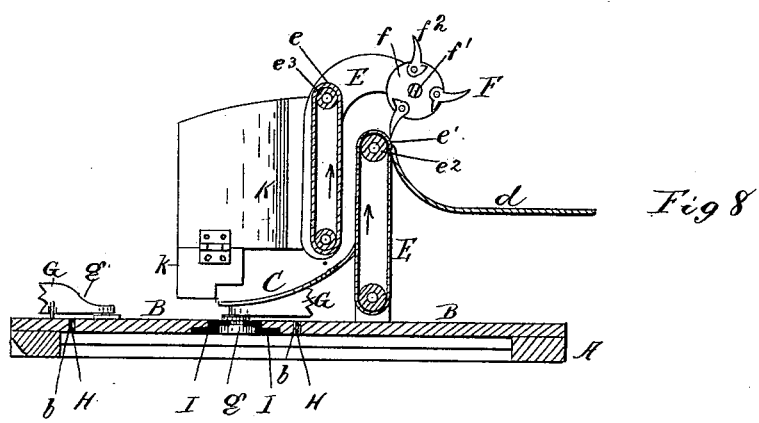

The binder D is located at the rear inner corner of the platform, inside of the main supporting-wheel and partly in rear thereof. It is arranged diagonally of the machine, as shown in Fig. 1 of the drawings, and the receiver and binding table $d$ is considerably below the upper portion of the main wheel, and therefore is raised only a comparatively short distance above the platform of the harvester. The upright shaft $d'$ is intended to carry the binding mechanism, which is swung outward and inward by the oscillation of this shaft. I shall not describe the binding mechanism which I propose to use, as it constitutes no part of the invention intended to be set forth in the present case, and the particular construction of the binding mechanism is not material to my present improvements. The location and arrangement of the binder are, however, part of my general plan to which my present improvements are adapted, and to this extent the binder, as a general feature, is an element. In front of the binder is arranged a grain-elevating device, E, which consists of two ordinary endless aprons, e and e', running over rollers e² and e³, which are mounted in suitable supports and arranged so that the aprons will run in substantially vertical planes. The front apron, e, extends down nearly to the inner end of the table, which is bent upward at its rear inner corner, as shown in Fig. 8 of the drawings. The rear apron, e', extends down below the table, and its upper end is not so high as that of the front elevator, and reaches a little above the upper edge of the grain-receiver. The inner turned-up corner of the table reaches about to this rear apron, the relative arrangement of these parts being substantially as shown in Fig. 8 of the drawings. At the upper end of the elevator is a packer, F, which should be arranged to take the grain soon after it leaves the elevator, and is intended to operate in the usual way to form compact bundles of uniform size. In the drawings I have shown this packing device consisting of disks $f$ on a shaft, $f'$, and arms $f^2$, pivoted to the disks, which are rotated by the shaft and operate in the usual well-known way, which need not be further described here. Any packing mechanism adapted to the purpose may be employed, however, for the particular construction of this device is not part of my present invention. As the grain is cut, it falls back on the platform, resting partly thereon and partly on the front edge of and over the table. In order to gather this cut grain and deliver it to the elevator in proper shape to be taken up by the latter, I provide a series of rakes, G, which are hinged or pivoted near one end to the endless chain H, from which they extend inward, and at the other end are hinged to guides or rollers $g$. These rakes are attached to the chain so as to stand up edgewise, and for some distance inward are of the same width, but then gradually slope off on an incline, $g'$, to the guide end, as shown in Fig. 8 of the drawings. The chain H is a drive-chain of any ordinary construction, and is arranged to run around sprocket-wheels $h\ h'\ h^2\ h^3\ h^4$, which are set in the platform, so as to be about flush therewith, the first-named being somewhat larger than the others and receiving motion from a driver, as will presently be described. These wheels are arranged so as to carry the chain along in a straight line from the grain to the stubble end of the platform, and near the front thereof, then to turn inward slightly around the larger wheel, $h$, thence diagonally back to the rear of the platform, along which it runs to near the outer corner, and thence forward again, and the platform is provided with a slot, $b$, of suitable shape to make a path for the chain in this course. The rakes stand above the chain, so as to sweep across the platform.

On the platform, underneath the table, is a cam-guideway, I, in which the guide-rollers $g$ are arranged to travel. This guideway has a substantially straight section, $i$, at the front thereof, running about parallel with the front edge of the platform. Then at its inner end, about in rear of the wheel $h'$, it turns, and a section, $i'$, runs back diagonally toward the rear of the platform for some distance, and then curves around forward and outward, and may be said to extend forward almost to the straight section $i$. Thence another section, $i^2$, extends backward again and is curved around outward and forward until it joins the outer end of the section $i$; but the two sections $i'\ i^2$ may be said to unite at their inner terminal points, thereby forming a wide central open space, $i^3$, as shown in Fig. 7 of the drawings, which fully illustrates the form of this guideway, as well as the arrangement of the rake-chain and its wheels. At the junction of the sections $i\ i'$ of this guideway a spring-switch, J, is placed, being provided with a spring, $j$, which acts to close the switch at the section $i$, but at the same time permits the switch to yield for the passage of the guide-rollers past it, and is shaped so that after the guide-roller has passed, any backward motion thereof will be turned by the switch into the diagonal way $i'$. A similar switch, J', is arranged in the enlarged space $i^3$, being provided with a spring, $j'$, which operates to close the switch in the way $i'$, but yields to permit the guide-rollers to pass by into the front portion of the space, being shaped so that any movement backward will turn the said rollers into the path $i^2$. At the inner end of the platform is an upright guard or fender, K, which extends from the front of the platform backward, just above and over the table nearly to the elevators, when it is turned outward somewhat, so as to be about parallel with the front elevator for the rest of the way, and is attached at its rear end to the elevator-frame. A compressor or gathering board, $k$, is hinged to the lower front portion of this guard, being arranged to extend across the uncovered portion of the platform in front of the table, and projecting somewhat below the front edge of the latter. A spring, $k'$, at the back of the fender, is arranged to act on this compressor in a direction to turn it outward—that is, toward the outer end of the platform—and in opposition to the movement of the rakes, bringing the grain along in this path. This spring compressor-board, acting against the rakes, operates in connection with them to straighten the grain and gather it in a compact bunch, which is then carried forward by the rakes to the elevator. The wheel $h$, which drives the rake chain, may be driven by any suitable gearing. I have shown in the drawings a gear-wheel, L, on an upright shaft, $l$, mounted on the frame just inside of the main wheel. On the upper surface of this wheel are two rims or beveled gears, $l'\ l^2$, the former within the latter, and on the under surface is a similar gear, $l^3$, which engages with a bevel-pinion, M, on a shaft, $m$, extending forward diagonally to the wheel $h$, and carrying at its forward end a bevel-pinion, $m'$, which engages with a bevel-gear on the under side of the wheel $h$. A spur-pinion, N, is driven by the main gear on the main wheel and rotates a short shaft, $n$, on the other end of which is a bevel-gear, $n'$, which engages with the inner bevel on the upper surface of the wheel L, and so communicates motion to the latter and thence to the rakes, this gearing being so arranged as to move the rakes across the platform from the outer to the inner end thereof at the front and thence back toward the rear of the machine.

In order to lay the grain properly on the platform, I make the reel adjustable, so as to adapt it to grain of different heights. This I accomplish by mounting the reel-shaft O in arms P, which in turn are mounted on a long sleeve, $p$, so as to vibrate, and are connected at their inner ends by links $p'$ to crank-arms $p^2$ on a rock-shaft, $p^3$, to which a lever, $p^4$, is attached, whereby it is obvious the reel-supporting arms may be vibrated to raise and lower the reel-shaft. A shaft, Q, runs through the sleeve $p$, and is provided with a small pinion, $q$, fastened to it just outside of each end of the sleeve and arranged inside of horizontal yokes or loops R, fastened to supporting-standards at the front part of the machine. Inside of these loops is a rack, $r$, with which the pinions $q$ engage. It is evident that these yokes or racks make a support for the sleeve $p$, and so for the arms which carry the reel-shaft. Whenever the reel is raised and lowered by the means just described, the sleeve-shaft oscillates, the pinions turning in the racks for this purpose, and so the reel is moved forward and back at the same time that it is raised and lowered. A lever, $q'$, may be fastened to the shaft Q, by which the latter may be oscillated, and so the reel adjusted.

In order to drive the reel, a crown gear-wheel, $o$, is fastened to the inner end of the reel-shaft, and a shaft, S, is extended up along the outside of this wheel, passing through the arms of a yoke, $s$, which is mounted loosely on the reel-shaft and embraces the wheel $o$, and is also free to slide back and forth on the shaft S. A pinion, $s'$, is feathered to the shaft S, and arranged to engage with the wheel $o$, so that the rotation of the shaft S will drive the reel, and at the same time the driving mechanism is such as to accommodate the adjustment of the reel by reason of the sliding yoke and pinion. This shaft S is connected at its lower end to a short shaft, T, by a universal joint, $s^2$, so that the upper end of the shaft may rise and fall with the adjustment of the reel, and at the same time will be driven in its different positions.

On the shaft T is a sprocket-wheel, $t$, over which a chain, $t'$, runs and is driven by a sprocket-wheel, $t^2$, on a shaft, $t^3$, which, as shown in the drawings, is intended for the crank-shaft that drives the cutters, and is itself driven by the outer bevel-gear on the upper face of the wheel L, which engages with the bevel-pinion on the inner end of the crank-shaft.

In order to communicate the required motion to the elevator-aprons, a bevel-gear, U, is fastened to the end of the upper roller of the inside apron and engages with a bevel-gear, $u$, at the rear face of the chain-wheel $t$, and so is driven thereby. Inside of the wheel U a sprocket-wheel, $e^4$, is also fastened to the same roller, and over this runs a chain, $e^5$, which also passes around a similar wheel, $e^6$, on the upper roller of the front elevator-apron, another, $f^3$, on the end of the packer-shaft, and a plain sheave, $e^7$, at the lower end of the elevator-frame, the wheel $e^4$ being arranged outside of the chain and the others inside. This chain will be driven under this arrangement of parts so as to move both elevator-aprons inward in the direction shown by arrows in the drawings, and at the same time drive the packer-shaft.

I have described above a complete mechanism for carrying out my invention as it was stated at the outset; but I do not wish to be understood as limiting myself in all particulars to details of construction, as above specified, and as shown in the drawings, for it is perfectly obvious that these may be changed in very many respects without departing from the main idea of my improvement, and this is especially true in regard to devices for communicating the required movements to the different parts, which may be varied in a great many ways. I have only intended to show and describe one complete organization for the purpose named, but without restricting myself to all the special devices and arrangements thereof in this organization.

The operation of the mechanism described is as follows: The grain by the action of the reel is brought to the cutters, and, as it is cut, laid back upon the platform. It is supported partly by the front portion of the platform and partly by the table over the front edge of which it lies. The rakes are brought out successively from under the table at the outer end of the platform, to the front of which they have also been brought by the operation of the chain, and the form of the guide-paths is such that at this point the rakes will be brought into a position nearly crosswise of the platform as they are brought in behind the grain. They then sweep across the front of the platform in a position about as shown in Figs. 1 and 7 of the drawings, and, obviously, will sweep the grain before them, which will be brought up against the elastic compressor or gathering board, at which point the rakes begin to turn somewhat to the rear, and at the same time are swung around so that the grain is turned around to the rear somewhat and brought directly within the action of the elevating-aprons, and to assist this delivery the free end of the table is elevated somewhat by the incline on the rakes as the latter are drawn back underneath the table. The grain thus delivered to the elevators is carried up by them and delivered to the receiver of the binder within reach of the packer.

I have not described in detail the movement of the different parts of the driving mechanism, for they will be understood by mechanics familiar with this class of machines. It is only necessary to say that they are so arranged and move in such directions as to give the required motions to the reel, rakes, and elevators, as stated above. The number of rakes attached to the chain may be more or less, as desired. In the drawings I have shown three, which I have found sufficient to do the work satisfactorily; but the number is simply arbitrary. The shape of the guideways is such as to turn the rakes something as shown in Fig. 7 of the drawings, in which it will be seen that they are held crosswise of the platform as they move along the front of the latter and until the guide-roller has passed the front switch. Then the guide is directed into the path rearward as the rake is pulled back by the chain, and is carried back to the rear of the platform in the position shown in Fig. 7. Then it is swung around again by the action of the guide as it passes the rear switch, so that it stands crosswise of the platform, but with the ends reversed. As the rake is carried along by the chain, the guide is at once brought into the last section of the path, by the action of which the rake is turned around and brought into its proper position for taking the grain, which has already been described.

With the construction and arrangement of the main parts of the machine as stated above it will be seen that I obtain what may be called a "low-down" binder—that is to say, the grain is not lifted over the main wheel, but, on the contrary, is elevated only a comparatively short distance from the platform. At the same time the location of the binder is such that the bundles may be readily discharged therefrom without interfering with the supporting-wheel or the operation of the parts of the machine.

Although I have described and shown a reel mechanism, it is simply for the purposes of illustration. The particular reel mechanism does not constitute a part of my present invention, and I distinctly disclaim it in this case.

Having thus described my invention, what I claim as new, and desire to secure by Letters Patent, is—

1. In a self-binding harvester, a grain receiver and binding table arranged near the inner rear corner of the platform, in combination with a grain-elevator arranged diagonally of said platform of the machine, substantially as and for the purposes set forth.

2. In a self-binding harvester, a grain receiver and binding table arranged near the inner rear corner of the platform, in combination with a grain-elevator arranged diagonally of the grain-platform of the machine and a packer-shaft also arranged diagonally of said platform, substantially as and for the purposes set forth.

3. In a self-binding harvester, a grain receiver and binding table arranged near the inner rear corner of the platform, in combination with a grain-elevator arranged diagonally of the grain-platform of the machine and a gathering mechanism which moves the grain from the platform and delivers it to the elevator, substantially as and for the purposes set forth.

4. The grain-platform, in combination with the table extending nearly to the front of the platform and free to rise and fall at its inner end, the elevator arranged diagonally of said platform at the free end of the table, and the gathering and delivering rakes, substantially as and for the purposes set forth.

5. The grain-elevator arranged as described, in combination with the grain-platform, the table free to rise and fall at its inner end, the gathering-rakes, and the yielding compressor or gathering board, substantially as and for the purposes set forth.

6. The grain-platform, in combination with the table free to rise and fall at its inner end and the gathering-rakes inclined at the rear ends and arranged to lift the free end of the table as they are drawn under the same, substantially as and for the purposes set forth.

7. The grain-receiver of the binder, in combination with two elevating-aprons, the front one arranged higher than the other, the grain-platform, the table with its inner end free to rise and fall and extending underneath the front elevator-apron, and the series of gathering-rakes, substantially as and for the purposes set forth.

8. The grain-platform, in combination with the rake-chain, the rakes hinged at their heads to the chain and at the other end to guides, and the guideway I, composed of three sections, $i$ $i'$ $i^2$, substantially as and for the purposes set forth.

9. The guideway I, composed of the sections $i$ $i'$ $i^2$, in combination with the switches J J', the rake-guides arranged to move in said guideway, the rake chain arranged to run in a slot in the platform, and the gathering-rakes hinged at one end to the chain and at the other to the guides, substantially as and for the purposes set forth.

10. The grain-elevator arranged diagonally of the grain-platform of the machine, in combination with the guard K, the spring compressor or gathering board $k$, the grain-platform, the table, and the gathering-rakes, substantially as and for the purposes set forth.

11. The grain-platform, in combination with the table extending nearly to the front of the platform and free at its inner end to rise and fall, the reel-shaft mounted in adjustable supports, and gathering-rakes arranged below the table and to lift the free end thereof as they pass underneath it, substantially as and for the purposes set forth.

RICHARD EMERSON.

Witnesses:
GEORGE BROWN,
WALTER H. LOOMIS.